United States Patent Office.

ISAAC M. GATTMAN, OF NEW YORK, N. Y.

Letters Patent No. 70,990, dated November 19, 1867; antedated November 14, 1867.

IMPROVEMENT IN THE MANUFACTURE OF WHITE LEAD.

The Schedule referred to in these Letters Patent and making part of the same.

TO ALL WHOM IT MAY CONCERN:

Be it known that I, ISAAC M. GATTMAN, of the city, county, and State of New York, have invented a new and useful Improvement in the Manufacture of White Lead; and I do hereby declare that the following is a full, clear, and exact description thereof, which will enable others skilled in the art to make and use the same.

The nature of this invention consists in manufacturing white lead by a new and improved process, whereby the metal is wholly converted, without waste, into white lead of great purity of color and perfect opacity, in a very short time compared with the ordinary and most approved process of corrosion of the metallic lead, known as the Dutch method.

In the manufacture of white lead, two methods are principally employed, one of which, commonly called the Dutch process, consists in the gradual corrosion of metallic lead exposed in various forms to the exhalations of acetic acid and carbonic acid gas generated by the fermentation of horse manure and tan-bark, the product of which is a truly amorphous homogeneous body, which is therefore opaque, possessing the covering quality that is an essential of good white paint. The other method is that known as the French process, which consists in subjecting a cold and weak solution of basic acetate of lead to a current of carbonic acid gas, which forms a precipitate of white lead, but different in its chemical combinations from the white lead produced by corrosion. This product is not amorphous and homogeneous, but is more or less crystalline and transparent, and therefore does not possess the quality of "body," as the painters call it, which gives white lead its commercial value. The white lead of commerce produced by the process of corrosion is a chemical combination of two equivalents of carbonate of lead with one equivalent of hydro-oxide of lead, denoted by the formula $2PbOCO^2 + PbOHO$. The white lead produced by the French process, as aforesaid, contains a much less proportion of hydro-oxide of lead, and is, in fact, only a neutral carbonate of lead, with an admixture of a small portion only of the hydrate, which, being precipitated from a weak and cold solution of basic acetate of lead, assumes naturally a crystalline character that renders it transparent, instead of being opaque, and therefore destitute of the requisite "body" of good paint. According to the French process, the cold solution of basic acetate of lead does not rise above the density of 17° Baumé, and is subjected to a current of carbonic acid gas as long as a precipitate is formed. While the solution remains basic, the precipitate formed is basic carbonate of lead, in accordance with the preceding formula, $2PbOCO^2 + PbOHO$; but as soon as the basic portion of the solution is precipitated, and while the current of carbonic acid gas is continued, a neutral carbonate of lead is then thrown down, the composition of which is expressed by the formula $PbO, CO^2$, which latter form of precipitate increases in inverse proportion to the strength of the solution of basic acetate of lead.

From a solution of one hundred pounds of neutral acetate of lead in five hundred pounds of water, subjected to a current of carbonic acid gas, there will be precipitated nineteen pounds of neutral carbonate of lead, whereas from a solution of one hundred pounds of neutral acetate of lead in three thousand pounds of water there will be precipitated forty-eight pounds, or two and one-half times the quantity of neutral carbonate of lead. This result, demonstrated by a series of practical experiments, establishes the fact stated, that the precipitate of the neutral carbonate of lead increases in the ratio of the weakness of the solution. Hence the crystalline character of the white lead produced by the so-called French process with a weak cold solution. The greater the proportion of neutral carbonate of lead, the more crystalline is the character of the product and the less valuable as a paint. My improved method of treatment obviates these objections to the white lead obtained by precipitation from a solution of the basic acetate of lead under a current of carbonic acid gas, which process is so far modified and changed by my improved method of conducting it, that I am enabled to produce white lead identical in its chemical combinations and in all respects equal to the white lead made by the so-called Dutch process of corrosion.

My improvement consists in employing a strong and hot solution, instead of a weak and cold solution, of basic acetate of lead, of a density ranging from 20° to 50° Baumé, which is subjected to a current of carbonic acid gas, and maintained at a temperature of about 175° to 180° Fahrenheit by means of a jet of steam introduced into the solution.

By this process the formation of a crystalline precipitate of neutral carbonate of lead is prevented, and only a basic carbonate of lead is precipitated, possessing identical chemical combinations with the white lead of corrosion hereinbefore stated, and consequently possessing the same qualities as a paint, in regard to "body" and opacity. Under these conditions no other result can follow than this chemical combination of the precipitate, because, as soon as the basic portion of the lead in solution is precipitated and the liquor is reduced to its neutral state, the acetic acid liberated counterbalances the action of the carbonic acid gas, so that no neutral carbonate of lead can be formed to deteriorate the precipitate. By this process, therefore, the chemical combination of the precipitate is identical with that of the white lead produced by corrosion, and is in all respects equal to it as a paint, having an amorphous character, while it is much superior to the precipitate of the weak cold solution of the basic acetate of lead, treated according to the French method, which is partly crystalline in its character, and therefore deficient in "body" and covering property as a paint. But when, through any inadvertence in the management of the process, it should happen that the solution is too weak, and the precipitate formed is consequently crystalline in its character, it may then be boiled in a solution of the basic acetate of lead, and thus restore the neutral carbonate again to the basic state by its taking up the basic portion of the solution, thereby correcting the deterioration of the precipitate.

Having described my invention or discovery, and the manner of carrying it out, by which it shall have practical effect, I claim as new, and desire to secure by Letters Patent—

1. Subjecting a strong and hot solution of the basic acetate of lead to a current of carbonic acid gas, substantially as and for the purpose herein described.

2. Applying steam in connection with a current of carbonic acid gas to a strong and hot solution of basic acetate of lead, substantially as and for the purpose specified.

3. Correcting defective precipitate of neutral carbonate of lead formed by the current of carbonic acid gas when the solution of basic acetate of lead may be too weak, by boiling it in a stronger solution of basic acetate of lead, as herein set forth.

4. The manufacture of pure amorphous white lead by the method substantially as herein described.

The above specification of my invention signed by me this 11th day of March, 1867.

I. M. GATTMAN.

Witnesses:
WM. F. McNAMARA,
ALEX. F. ROBERTS.